United States Patent
Alcorn et al.

(10) Patent No.: US 7,805,434 B2
(45) Date of Patent: Sep. 28, 2010

(54) PERFORMING A NON-INVASIVE RUNTIME SIMULATION FOR A DATABASE SYSTEM

(75) Inventors: Michael Harold Alcorn, Hollister, CA (US); Upendra D. Chitnis, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 477 days.

(21) Appl. No.: 11/331,323

(22) Filed: Jan. 12, 2006

(65) Prior Publication Data

US 2007/0162418 A1 Jul. 12, 2007

(51) Int. Cl.
*G06F 7/00* (2006.01)
*G06F 17/30* (2006.01)

(52) U.S. Cl. .................. 707/713; 707/741; 707/649
(58) Field of Classification Search .................. 707/2
See application file for complete search history.

(56) References Cited

U.S. PATENT DOCUMENTS

| | | | |
|---|---|---|---|
| 5,430,871 A | | 7/1995 | Jamoussi et al. |
| 5,692,174 A | | 11/1997 | Bireley et al. |
| 5,848,393 A | | 12/1998 | Goodridge et al. |
| 6,266,658 B1 * | | 7/2001 | Adya et al. ............... 707/2 |
| 6,470,330 B1 * | | 10/2002 | Das et al. ............... 707/2 |
| 6,556,983 B1 * | | 4/2003 | Altschuler et al. ............ 706/55 |
| 6,560,593 B1 * | | 5/2003 | Kosciuszko et al. ............ 707/2 |
| 6,615,222 B2 | | 9/2003 | Hornibrook et al. |
| 7,051,300 B1 * | | 5/2006 | Shen et al. ............... 716/4 |
| 7,272,589 B1 * | | 9/2007 | Guay et al. ............... 707/2 |
| 2002/0046204 A1 | | 4/2002 | Hayes |
| 2003/0088541 A1 | | 5/2003 | Zilio et al. |
| 2003/0115212 A1 * | | 6/2003 | Hornibrook et al. ..... 707/103 R |
| 2004/0002957 A1 * | | 1/2004 | Chaudhuri et al. ............ 707/2 |
| 2004/0003088 A1 | | 1/2004 | Ng et al. |
| 2004/0078461 A1 * | | 4/2004 | Bendich et al. ............ 709/224 |
| 2004/0225631 A1 | | 11/2004 | Elnaffar et al. |
| 2005/0097517 A1 * | | 5/2005 | Goin et al. ............... 717/124 |
| 2005/0203940 A1 * | | 9/2005 | Farrar et al. ............... 707/102 |

OTHER PUBLICATIONS

Scientific Method Flowchart, Aug. 2001, 'www.kunaschools.org'.*

* cited by examiner

*Primary Examiner*—Cam Y T Truong
(74) *Attorney, Agent, or Firm*—Stephen J. Walder, Jr.; Elissa Y. Wang

(57) ABSTRACT

Mechanisms for evaluating at least one setting for a database system are disclosed. The mechanisms include providing at least one configuration derivative including the at least one setting. The configuration derivative is uncommitted. The mechanisms also include running the database system for a period of time. The database system is run using a committed configuration including a plurality of settings for the database system. The mechanisms also include collecting data on performance of the database system based on the at least one configuration derivative during the running of the database.

17 Claims, 3 Drawing Sheets

PERFORMING A NON-INVASIVE RUNTIME SIMULATION FOR A DATABASE SYSTEM

FIELD OF THE INVENTION

The present invention relates to database systems and more particularly to a method and system for evaluating configurations for a database system using a non-invasive runtime simulation.

BACKGROUND OF THE INVENTION

Database systems are used for a variety of applications. In order to accommodate large amounts of data and provide increased functionality, conventional database systems have become increasingly complex. Consequently, conventional database systems are desired to be autonomic systems. Such conventional autonomic database systems share properties such as being self-aware and being capable of adapting to varying and even unpredictable conditions.

Providing autonomic capabilities in database systems is typically achieved by incorporating subsystems, such as conventional wizards and optimizers, into the database systems. For example conventional autonomic systems may include wizards and/or optimizers for evaluating performance of the conventional database system and adapting to improve performance by generating and/or implementing changes to the conventional database system. These wizards and/or optimizers may assist in setting the initial settings for the conventional database system and/or assist in updating or tuning settings in an autonomic conventional database system. Such wizards thus configure a variety of settings, or parameters, that pertain to items such as server agents, input/output subagents, logging, sorting, and other operations and components of the database system. Moreover, the settings may include a set of indexes and materialized query tables (MQTs). These settings are determined based on characteristics of the database systems such as total memory available, the number of disks, the number of CPUs, as well as other information, some of which may be user-supplied. Together, these settings are termed the configuration of the database systems. Thus, conventional database systems may use wizards and/or optimizers for providing the configuration of the conventional database system.

For example, FIG. 1 depicts a conventional method 10 for determining the settings for a conventional database system. The database system is monitored, typically by obtaining a snapshot of the conventional database system, via step 12. A snapshot is effectively the status of the conventional database system at a particular instant in time. Thus, the snapshot represents the status of the database system at a particular point in time. For example, the snapshot may be the database workloads at a particular time. Thus, the work load, the CPU usage, memory space or consumption for use in caching and sorting, buffer pool activity, logging behavior, disk space, the behavior of existing objects, and/or other characteristics of the conventional database system may be obtained in the snapshot.

The snapshot is analyzed in order to determine a desired configuration, via step 14. Thus, the status of the conventional database system in the snapshot is used to determine settings that may improve or maintain certain aspects of the performance of the conventional database system. If the conventional database system is autonomic, the analysis may be performed by a conventional wizard and/or optimizer. In some conventional database systems, the analysis may include a cost/benefit analysis to determine whether the cost of implementing a particular configuration is warranted for the benefits expected to be achieved.

At least one configuration is provided based on the analysis, via step 16. Greater than one configuration might be provided to allow a system administrator or other authorized user to select between the configurations to implement the configuration they believe is optimal. The authorized user may also alter some of the settings on a particular configuration provided. A selected configuration is committed, via step 18. Typically, the system administrator selects the configuration to be committed at least for the initial configuration. However, particularly for an autonomic conventional database system, the system might select the configuration to be committed. Thus, the selected configuration is implemented for the conventional database system to use.

Once the selected configuration is committed, the database is allowed to run using the settings in the committed configuration, via step 20. For many conventional database systems, once the settings are initially committed, the conventional database system is simply allowed to run with static settings. However, steps 12, 14, 16, 18, and 20 may optionally be repeated, via step 22. For example, in an autonomic conventional database system, the steps 12, 14, 16, 18, and 20 may be repeated periodically in order to adjust the configuration to account for changes in the conventional database system.

Although the conventional method 10 allows for the configuration of a conventional database system to be updated, one of ordinary skill in the art will readily recognize that there may be significant drawbacks to the use of the conventional method 10. In particular, the analysis performed in step 14 is based upon a snapshot of the status of the database system. The characteristics of the conventional database system, such as work flow, memory consumption, or other characteristics change over time. In particular, in "real time" warehouse environments, the complexity and diversity of user workloads is enormous. Static snapshots may not be sufficient in these dynamic environments because snapshots are limited by the scope of their input stream at time t(n). In addition, conventional wizard that use such static snapshots generally operate under resource constraints, such as finite time and disk space. As a result, it is entirely possible to formulate sub-optimal performance strategies because lots of possibilities exist in the solution's search space. In most cases, the conventional wizard's optimal solution must converge in a relatively short time which compounds the problem. Thus, the new configuration committed in step 18 may already be out of date or may not be appropriate for future usage of the conventional database system. Moreover, the configurations are typically quite complex. As a result, the new configuration may have unintended consequences. Even if the new configuration improves performance in a particular area, its consequences on another aspect of the performance of the conventional database system may be disastrous. Moreover, building the new configuration, for example forming MQTs may consume a significant amount of resources. It may be difficult to justify the additional resource when the effects of the new configuration are only surmised based on one or more snapshots.

Accordingly, what is needed is an improved method and system for updating the performance of a database system. The present invention addresses such a need.

BRIEF SUMMARY OF THE INVENTION

The present invention provides a method and system for evaluating at least one setting for a database system. The method and system comprise providing at least one configuration derivative including the at least one setting. The configuration derivative is uncommitted. The method and system also comprise running the database system for a period of time. The database system is run using a committed configuration including a plurality of settings for the database system. The method and system also comprise collecting data on performance of the database system based on the at least one configuration derivative during the running of the database.

According to the method and system disclosed herein, the present invention allows for evaluation of the setting(s) during actual running of the database system without requiring the setting(s) to be committed

DETAILED DESCRIPTION OF THE INVENTION

Figure 1:
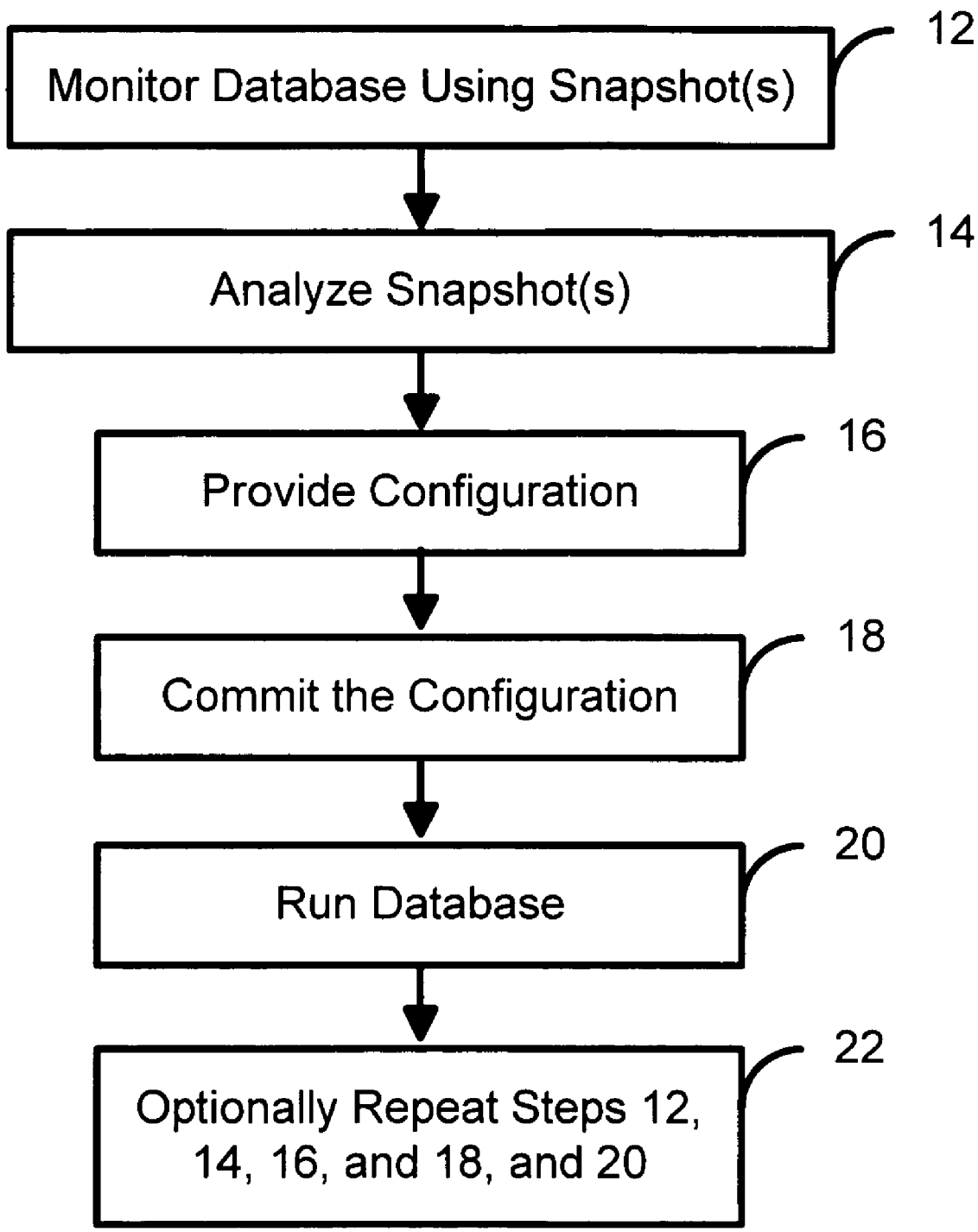
FIG. 1 is a flow chart depicting a conventional method for providing a configuration for a conventional database system.

The present invention relates to database management systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for evaluating at least one setting for a database system. The method and system comprise providing at least one configuration derivative including the at least one setting. The configuration derivative is uncommitted. Thus, the configuration derivative includes settings that might be used to run the database. However, because the configuration derivative is not committed, the settings are not actually used. Instead, the database system is run using a committed configuration including a plurality of settings for the database system. The method and system also comprise collecting data on performance of the database system based on the at least one configuration derivative during the running of the database.

Because the configuration derivative is not committed, the database system does not utilize plans based on the configuration derivative. Further, because the configuration derivative is not a committed configuration object, the database system may analyze and score performance metrics based on both committed (settings actually used) and uncommitted (the configuration derivative) configuration objects. The database system may cost access plans based on committed configuration objects and uncommitted configuration derivates, but only plans based on committed configuration are valid. If the performance scores captured at runtime indicate that there is a significant expectation that the access plans based on configuration derivatives will—in aggregate—improve performance, then a database system may commit the configuration derivatives.

The present invention will be described in terms of a particular database system and particular settings. However, one of ordinary skill in the art will readily recognize that the method and system may be used with other database systems and correspond to other and/or additional settings. The present invention is also described in the context of particular applications. However, one of ordinary skill in the art will readily recognize that the method and system are consistent with the use of a variety of applications. For ease of explanation, the method in accordance with the present invention is also described in the context of particular steps. One of ordinary skill in the art will, however, readily recognize that the method may include additional and/or different steps consistent with the present invention.

Figure 2:
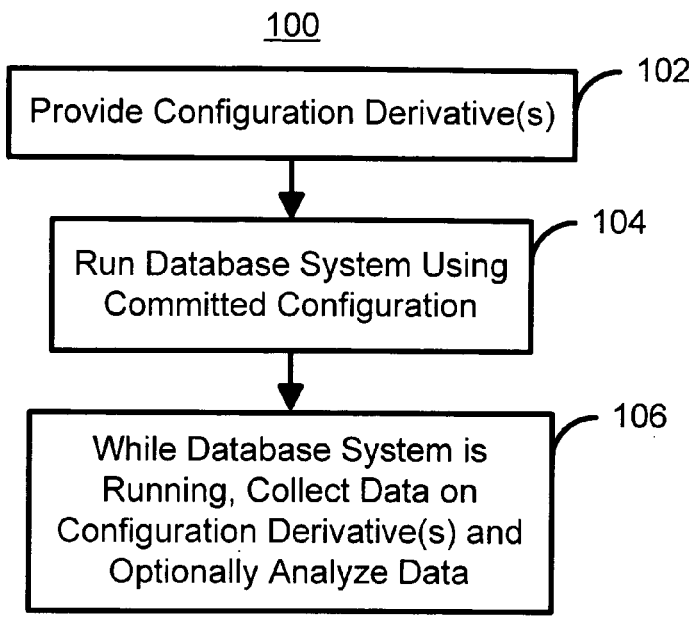
FIG. 2 is a diagram depicting one embodiment of a method in accordance with the present invention for providing a configuration for a database system.

To more particularly describe the present invention, refer to FIG. 2 depicting one embodiment of a method 100 in accordance with the present invention for providing a configuration for a database system. At least one configuration derivative is provided, via step 102. A configuration derivative includes the at least one setting, and may include all of the settings. However, the configuration derivative(s) are not committed. Thus, the database system operates on another, committed configuration. For example, the configuration derivative may include settings such as indices and/or MQTs, and may relate to items such as server agents, input/output subagents, logging, sorting, and other operations and components of the database system. Although all of the settings might be provided, as few as a single setting might be included in the configuration derivative. For example, the configuration might merely change a setting such as the INTRA_PARALLEL setting from a NO to a YES. The configuration derivative might also include a database object. Consequently, in the context of the present invention, a setting may include a database object, a parameter, an MQT, an index, a database object, or other setting related to operation or one or more components of the database system.

The database system is run for a period of time and using a committed configuration including a plurality of settings for the database system, via step 104. Thus, the configuration derivative(s) do not provide the setting(s) actually committed to the database. Instead, the settings in the separate, committed configuration are used for running the database. This committed configuration might be one that is obtained in a conventional manner using a conventional wizard and/or might be based upon a previous iteration of the method 100.

While the database is running, data is collected on performance of the database system based on the configuration derivative(s), via step 106. Step 106 may also include analyzing the data collected in addition to actually obtaining the data related to the configuration derivative(s). For example, step 106 may include determining whether and/or how many times indices are used, whether and/or how many times MQT (s) are used, how and whether objects are used, and the efficacy of particular settings as well as the configuration derivative in its entirety. In addition, a cost-benefit analysis might be performed for the configuration derivative(s) based upon the cost of implementing aspects of the configuration derivative(s) and the benefits achieved during running of the database. Thus, step 106 may obtain data on and score the performance of the configuration derivative. In a preferred embodiment, step 106 is performed in the background. Thus, performing step 106 for the configuration derivative should not significantly affect the performance of the database. In addition, step 106 might be performed for a variety of times. For example, step 106 might be performed for a day, a week, a month, or another time. It may be desirable for step 106 to be performed for a sufficient time to allow the database system to operate under a full range of expected conditions. However, it is not necessary to do so. Step 106 may thus provide an indication of how the configuration derivative performs under operating conditions of the database. Stated differently, step 106 may be considered to be a runtime simulation feedback loop for the configuration derivative.

Thus, using the method 100, database configurations can be evaluated in a non-invasive manner. The effects of implementing the configuration derivative(s) may, therefore, be better understood prior to actually implementing a particular configuration derivative. An authorized user such as a system administrator may thus be able to avoid unintended consequences to implementing a configuration derivative. Further, resources may not be needlessly expended on configuration derivatives that may significantly adversely affect the performance of the database system. Moreover, the authorized user may have an opportunity to adjust the settings prior to implementation, further improving the performance of the database system. Thus, once the desired configuration derivative is actually committed, the database system may be better able to anticipate and adapt to changes in the workloads. In short, configuration derivatives capture performance scores at runtime. As a result, the recommendations based on these scores are better simply because the input stream is not limited by a point-in-time, static snapshot. Consequently, overall database system performance and ease of use of the database system may be improved.

Figure 3:
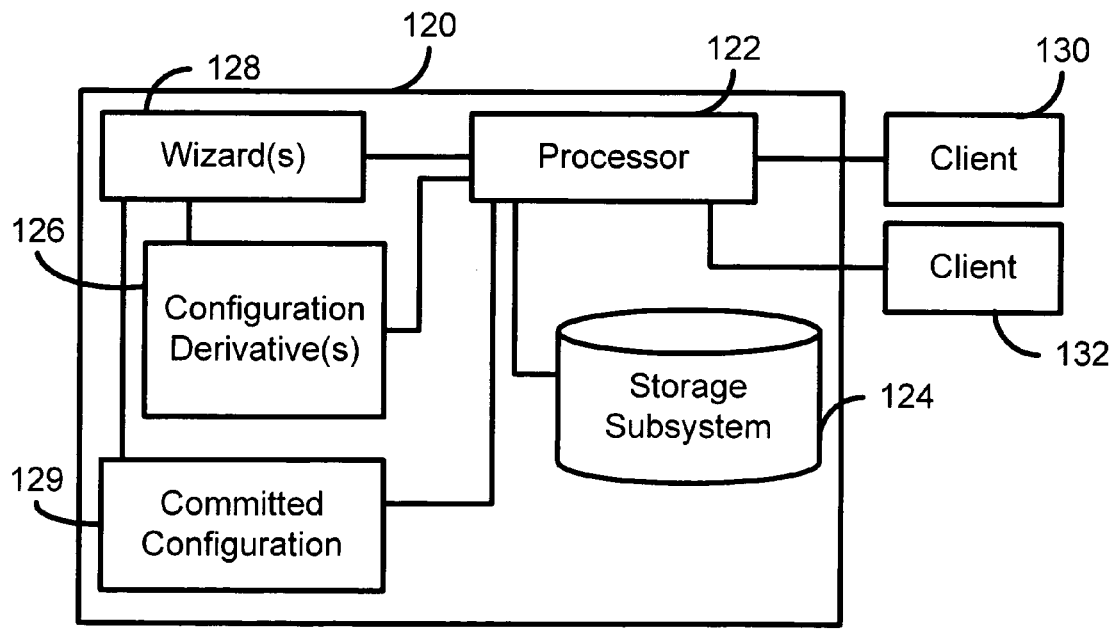
FIG. 3 is a diagram depicting one embodiment of a database system formed in accordance with the present invention.

FIG. 3 is a diagram depicting one embodiment of a database system 120 formed in accordance with the present invention. The database system includes a processor 122, a storage subsystem 124, configuration derivative(s) 126, wizard(s) 128, and a committed configuration 129. Also depicted are clients 130 and 132 that may be used by an authorized user to configure the database system 120 or to use the database system 120. The configuration derivative(s) 126 are those provided using the method 100. The wizard(s) 128 may include a configuration wizard, a tuning wizard, an optimizer or some combination thereof. The committed configuration 129 is actually used in running the database system 120. The committed configuration 129 may have been provided by simply using one of the wizard(s) 128, from a previous configuration derivative, by the authorized user, or some combination thereof. The method 100 may thus be implemented using a combination of the configuration derivative(s) 126, the wizard(s) 128, and the processor 122. Consequently, the benefits of the method 100 may be achieved using the database system 120.

Figure 4:
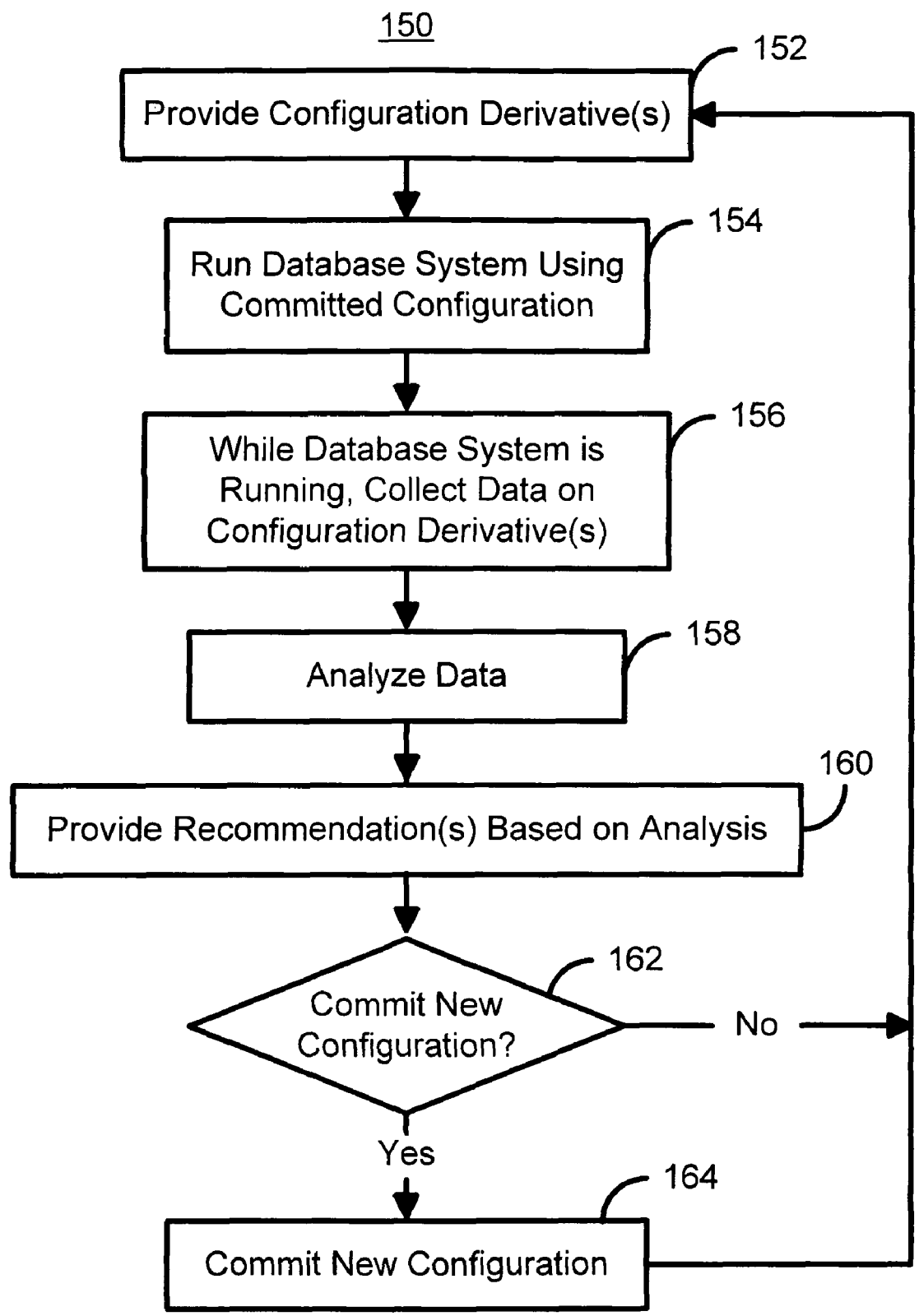
FIG. 4 is a diagram depicting another embodiment of a method in accordance with the present invention for providing a configuration for a database system.

FIG. 4 is a diagram depicting another embodiment of a method 150 in accordance with the present invention for providing a configuration for a database system. The method 150 is described in the context of the system 120. However, the method and system may be used with another system (not shown).

At least one configuration derivative 126 is provided, for example by the processor 122, via step 152. However, the configuration 126 derivative(s) are not committed. The step 152 is thus analogous to step 102 of the method 100.

The database system 120 is run for a period of time and using the committed configuration 129 that includes a plurality of settings for the database system 120, via step 154. Thus, the configuration derivative(s) 126 do not provide the setting(s) actually committed to the database system 120. Instead, the settings in the separate, committed configuration 129 are used for running the database. This committed configuration 129 may be one that is obtained in a conventional manner using a conventional wizard and/or might be based upon a previous iteration of the method 100.

While the database is running, data is collected on performance of the database system based on the configuration derivative(s), via step 156. For example, step 156 may include determining whether and/or how many times indices are used, whether and/or how many times MQT(s) are used, how and whether objects are used, or data relating other aspects of performance or components of the database system 120. In a preferred embodiment, step 156 is performed in the background. Thus, performing step 156 for the configuration derivative should not significantly affect the performance of the database. In addition, step 156 might be performed for a variety of times. For example, step 156 might be performed for a day, a week, a month, or another time. It may be desirable for step 156 to be performed for a sufficient time to allow the database system to operate under a full range of expected conditions. However, it is not necessary to do so. Moreover, the data obtained in step 156 may be stored in a variety of manner. In one embodiment, data obtained in step 156 may be stored in catalog table(s) dedicated to the configuration derivative(s) 126. The data in step 156 may thus provide an indication of how the configuration derivative performs under operating conditions of the database.

The data obtained in step 156 is analyzed to determine the performance of the configuration derivative(s) 126, via step 158. Stated differently, the configuration derivative(s) 126 are scored and, in some embodiments, compared to the performance of the committed configuration 129. For example, step 158 may include determining the efficacy of particular settings as well as the efficiency of the configuration derivative 126 in its entirety. Step 158 may also include performing a cost-benefit analysis might be performed for the configuration derivative(s) based upon the cost of implementing aspects of the configuration derivative(s) and the benefits achieved during running of the database. In a preferred embodiment, step 158 is also performed in the background. Thus, performing step 158 for the configuration derivative(s) 126 should not significantly affect the performance of the database.

At least one recommendation may be provided based on the analysis, via step 160. For example, the recommendation(s) may include but are not limited to a selection of a specific configuration derivative(s) 126, continued use of the committed configuration 129, changes of specific settings, formation of new configuration derivate(s) and further simulation and analysis using the steps 156 and 158. The recommendation(s) may be provided to an authorized user and/or the wizard(s) 128 in step 160.

It is determined, based on the analysis and recommendations provided, whether to commit a configuration or run further simulations, via step 162. This determination may be made using one of the wizard(s) 128. If so, the steps 152, 154, 156, 158, 160, and 162 together may be considered to be a runtime simulation feedback loop for the configuration derivative(s) 126. Step 162 may also be performed by an authorized user. Thus, the authorized user, such as a system administrator, may use the recommendation(s) to determine what action to take. In addition, step 162 may determine whether to commit one of the configuration derivative(s) 126 in its entirety or whether to commit a portion of one of the configuration derivative(s) 126, with some settings specified by the user or wizard(s) 128.

If it is determined that the configuration is not to be committed, then the method may return to step 152 to determine new configuration derivative(s). In such a case, determination of the new configuration derivative(s) may simply implement the configuration derivative(s) suggested in step 160. If it is determined that a configuration is to be committed, then the configuration is committed, via step 164. Thus, the database system 120 can be run using the new configuration that has been tested using the method 150.

Thus, using the method 150, database configurations can be evaluated in a non-invasive manner. The effects of implementing the configuration derivative(s) may, therefore, be better understood prior to actually implementing a particular configuration derivative. An authorized user such as a system administrator may thus be able to avoid unintended consequences to implementing a configuration derivative. Further, resources may not be needlessly expended on configuration derivatives that may significantly adversely affect the performance of the database system. Moreover, the authorized user may have an opportunity to adjust the settings prior to implementation, further improving the performance of the database system. Thus, once the desired configuration derivative is actually committed, the database system may be better able to anticipate and adapt to changes in the workloads. Consequently, overall database system performance and ease of use of the database system may be improved.

A method and system for evaluating settings for a database system. The present invention has been described in accordance with the embodiments shown, and one of ordinary skill in the art will readily recognize that there could be variations to the embodiments, and any variations would be within the spirit and scope of the present invention. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Accordingly, many modifications may be made by one of ordinary skill in the art without departing from the spirit and scope of the appended claims.

We claim:

1. A method for evaluating at least one desired setting for a database system comprising:
   providing at least one configuration derivative including the at least one desired setting, the configuration derivative being uncommitted such that the at least one desired setting is not used in actual operation of the database system;
   running the database system for a period of time in standard and actual operation of the database system, the period of time greater than a point in time and being sufficient time to allow the database system to operate under a plurality of different conditions of the standard and actual operation, wherein the database system is run using a committed configuration, the committed configuration including a plurality of settings for the database system, at least one of the plurality of settings being different than the at least one desired setting in the configuration derivative;
   collecting and storing data on performance of the database system based on the at least one configuration derivative during the running of the database system for the period of time, the data related to the at least one configuration derivative, wherein the data is collected based on the at least one configuration derivative as a background process during the running of the database system in the actual operation, the actual operation using the committed configuration, the collecting the data being performed during an operation under the plurality of different conditions of the standard and actual operation; and
   analyzing the data to evaluate a performance of the configuration derivative as an alternate configuration to the committed configuration for the running of the database system in the actual operation, the evaluation occurring prior to committing the configuration derivative, the analyzing the data including using the data collected during the different conditions of the standard and actual operation and indicating how the configuration derivative performs under the different conditions of the standard and actual operation, wherein the at least one desired setting includes at least one materialized query table for the database system or at least one index and wherein the collecting further includes at least one of determining whether the at least one materialized query table is utilized during the actual operation of the database system over the period of time or determining a number of times the at least one index is used during the actual operation of the database system.

2. The method of claim 1 wherein the at least one desired setting includes at least one materialized query table for the database system.

3. The method of claim 2 wherein the collecting data further includes:
   determining whether the at least one materialized query table is utilized during the actual operation of the database system over the period of time.

4. The method of claim 1 wherein the database system further includes an optimizer and wherein the at least one desired setting is provided by the optimizer.

5. The method of claim 1 wherein the database system further includes an optimizer and wherein the data collecting is performed using the optimizer.

6. The method of claim 1 further comprising:
   returning the data to an authorized user; and
   allowing the authorized user to commit at least a portion of the at least one setting.

7. The method of claim 1 further comprising providing at least one recommended setting based on the analyzing of the data.

8. The method of claim 7 further comprising:
   providing the at least one recommended setting to an authorized user.

9. The method of claim 1 wherein the at least one configuration derivative includes a plurality of different configuration derivatives and wherein the method further includes:
   performing a comparison of the plurality of configuration derivatives based on the collected data; and
   allowing a user to implement one of the plurality of configuration derivatives based on the comparison.

10. The method of claim 1 wherein the at least one desired setting further includes at least one index and wherein the collecting further includes:
    determining whether the at least one index is used during the actual operation of the database system.

11. The method of claim 10 wherein the index determining further includes:
    determining a number of times the at least one index is used during the actual operation of the database system.

12. The method of claim 1 wherein the analyzing the data includes providing one or more performance metric scores indicative of the performance of the configuration derivative during actual operation and providing one more performance metric scores indicative of the performance of the committed configuration during actual operation, and wherein the analyzing the data includes comparing the performance metric scores for the configuration derivative to the performance metric scores for the committed configuration.

13. The method of claim 12 further comprising committing the configuration derivative when the comparison of performance metric scores indicates that there is an expectation that the configuration derivative improves the performance of the database system relative to the committed configuration.

14. The method of claim 1 wherein the collecting the data is performed for a sufficient time to allow the database system to operate under a full range of expected conditions.

15. The method of claim 1 wherein the collecting the data includes collecting whether and how many times indices are used by the configuration derivative during the actual operation, whether and how many times materialized query tables are used by the configuration derivative during the actual operation, and whether and how objects are used by the configuration derivative during the actual operation.

16. A method for evaluating at least one desired setting for a database system comprising:
  providing at least one configuration derivative including the at least one desired setting, the configuration derivative being uncommitted such that the at least one desired setting is not used in actual operation of the database system;
  running the database system for a period of time in standard and actual operation of the database system, the period of time greater than a point in time and being sufficient time to allow the database system to operate under a plurality of different conditions of the standard and actual operation, wherein the database system is run using a committed configuration, the committed configuration including a plurality of settings for the database system, at least one of the plurality of settings being different than the at least one desired setting in the actual operation configuration derivative;
  collecting and storing data on performance of the database system based on the at least one configuration derivative during the running of the database system for the period of time, the data related to the at least one configuration derivative, wherein the data is collected based on the at least one configuration derivative as a background process during the running of the database system in the actual operation, the actual operation using the committed configuration, the collecting the data being performed during the under the plurality of different conditions of the standard and actual operation; and
  analyzing the data to evaluate a performance of the configuration derivative as an alternate configuration to the committed configuration for the running of the database system in the actual operation, the evaluation occurring prior to committing the configuration derivative, wherein the data is analyzed as a background process during the running of the database system in the actual operation, the analyzing the data including using the data collected during the different conditions of the standard and actual operation and indicating how the configuration derivative performs under the different conditions of the standard and actual operation, wherein the analyzing the data includes providing one or more performance metric scores indicative of the performance of the configuration derivative during the actual operation and providing one more performance metric scores indicative of the performance of the committed configuration during the actual operation, and wherein the analyzing the data includes comparing the performance metric scores for the configuration derivative to the performance metric scores for the committed configuration, wherein the at least one desired setting includes at least one materialized query table for the database system or at least one index and wherein the collecting further includes at least one of determining whether the at least one materialized query table is utilized during the actual operation of the database system over the period of time or determining a number of times the at least one index is used during the actual operation of the database system.

17. A method for evaluating at least one desired setting for a database system comprising:
  providing at least one configuration derivative including the at least one desired setting, the configuration derivative being uncommitted such that the at least one desired setting is not used in actual operation of the database system, wherein the least one desired setting includes at least one materialized query table for the database system and includes at least one index;
  running the database system for a period of time in standard and actual operation, the period of time greater than a point in time and being sufficient time to allow the database system to operate under a plurality of different conditions of the standard and actual operation, wherein the database system is run using a committed configuration, the committed configuration including a plurality of settings for the database system, at least one of the plurality of settings being different than the at least one desired setting in the configuration derivative;
  collecting and storing data on performance of the database system based on the at least one configuration derivative during the running of the database system for the period of time, the data related to the at least one configuration derivative, wherein the data is collected based on the at least one configuration derivative as a background process during the running of the database system in actual operation, the actual operation using the committed configuration, wherein the collecting the data is performed during an operation under the plurality of different conditions of the standard and actual operation, and wherein the collected data includes whether the at least one materialized query table is utilized during the actual operation of the database system, whether the at least one index is used during the actual operation of the database system, and a number of times the at least one index is used during the actual operation of the database system;
  analyzing the data to evaluate a performance of the configuration derivative as an alternate configuration to the committed configuration for the running of the database system in the actual operation, the evaluation occurring prior to committing the configuration derivative, wherein the data is analyzed as a background process during the running of the database system in actual operation, wherein the analyzing the data includes using the data collected during the different conditions of the standard and actual operation and indicating how the configuration derivative performs under the different conditions of the standard and actual operation, wherein the analyzing the data includes providing one or more performance metric scores indicative of the performance of the configuration derivative during the actual operation and providing one more performance metric scores indicative of the performance of the committed configuration during the actual operation, and wherein the analyzing the data includes comparing the performance metric scores for the configuration derivative to the performance metric scores for the committed configuration; and committing the configuration derivative when the comparison of performance metric scores indicates that there is an expectation that the configuration derivative improves the performance of the database system relative to the committed configuration, wherein the collecting further includes at least one of determining whether the at least one materialized query table is utilized during the actual operation of the database system over the period of time or determining a number of times the at least one index is used during the actual operation of the database system.

* * * * *